United States Patent
Nomura et al.

(10) Patent No.: US 7,614,183 B2
(45) Date of Patent: Nov. 10, 2009

(54) COMPLEX SYSTEM OF VEGETATION AND SOLAR CELL

(75) Inventors: Takuji Nomura, Otsu (JP); Yoshiteru Nitta, Osaka (JP); Tsuneo Tajima, Tokyo (JP); Takayoshi Imai, Tokyo (JP); Tooru Kojima, Tokyo (JP); Akihiro Sakamoto, Tokyo (JP); Takuji Hashimoto, Tokyo (JP)

(73) Assignee: Kaneka Corporation, Osaka (JP)

(*) Notice: Subject to any disclaimer, the term of this patent is extended or adjusted under 35 U.S.C. 154(b) by 506 days.

(21) Appl. No.: 10/554,476

(22) PCT Filed: Apr. 21, 2004

(86) PCT No.: PCT/JP2004/005744

§ 371 (c)(1),
(2), (4) Date: Oct. 24, 2005

(87) PCT Pub. No.: WO2004/094748

PCT Pub. Date: Nov. 4, 2004

(65) Prior Publication Data

US 2006/0272207 A1 Dec. 7, 2006

(30) Foreign Application Priority Data

Apr. 23, 2003 (JP) .............................. 2003-119020
Jan. 16, 2004 (JP) .............................. 2004-008687

(51) Int. Cl.
*A01G 9/02* (2006.01)
(52) U.S. Cl. ...................... 47/65.9; 52/173.1; 52/173.3
(58) Field of Classification Search ................. 47/65.9, 47/65.5, 33, 86, 66.6; 52/173.1, 173.3; 136/244; 248/237
See application file for complete search history.

(56) References Cited

U.S. PATENT DOCUMENTS

| 5,410,840 | A | * | 5/1995 | Loesken | .................. | 47/58.1 R |
| 5,724,766 | A | * | 3/1998 | Behrens | ......................... | 47/56 |
| 6,606,823 | B1 | * | 8/2003 | McDonough et al. | ........ | 47/65.9 |
| 6,711,851 | B2 | * | 3/2004 | Mischo | ....................... | 47/65.9 |

FOREIGN PATENT DOCUMENTS

| JP | 06-085306 | 3/1994 |
| JP | 06-315608 | 11/1994 |
| JP | 11-293717 | 10/1999 |
| JP | 2001-140426 | 5/2001 |
| JP | 2002-206349 | 7/2002 |
| JP | 2004-049139 | 2/2004 |

* cited by examiner

*Primary Examiner*—T. Nguyen
(74) *Attorney, Agent, or Firm*—Hogan & Hartson LLP

(57) ABSTRACT

A complex system where a plant group having a heat island phenomenon suppression effect and a solar cell having a carbon dioxide generation suppression effect are installed together. The purposes are to eliminate an adverse influence of both shadows of the plant group and the solar cell and to prevent the solar cell system from flying away by the wind pressure against the base side. The average height of the solar cell module is greater than that of the plant group. The plant group and the solar cell module are installed with a gap larger than the distance corresponding to the height difference between them. At least between the paired plant group and solar cell which face each other, an area for a person to walk through is provided. More than half of the ventilation area of the base side is covered with the plant group, a heat insulating material, and a moisture-retaining material.

16 Claims, 6 Drawing Sheets

COMPLEX SYSTEM OF VEGETATION AND SOLAR CELL

BACKGROUND OF THE INVENTION

1. Field of the Invention

The present invention relates to a complex system of vegetation and a solar cell in which a plant group having a heat island phenomenon suppression effect and a solar cell having a carbon dioxide generation suppression effect are installed together.

2. Description of the Related Art

Greenification, which involves planting plants on the roofs of structures such as buildings in order to suppress the heat island phenomenon of densely populated urban areas that has become a problem in recent years, is being implemented nowadays. Further, solar cells, which do not involve fossil fuels, that is, which constitute a power-generation technology with a low environmental load without involving the generation of carbon dioxide, have been put to practical use. As a method that installs plants and solar cells together, a method that installs plants on the roof of a building and solar cells on the walls thereof has been disclosed by Japanese Patent Application Laid Open No. 2002-364137, for example. Further, a method that installs plants on one side of a sloping roof and solar cells on the other side thereof has been disclosed by Japanese Patent Application Laid Open No. 2002-206349. However, even though the reception of solar light by plants and solar cells is a requirement for the production of the effect, these methods are installation methods in which at least the amount of light received in either case is small and an installation method that installs plants and solar cells together on substantially the same plane has not been proposed. It may be surmised that the problems of the effect of the shadows of the plants and solar cells as well as maintenance have not been resolved.

Furthermore, as mentioned in 'Design and Execution of a solar light generation system (Second Edition)' (editor: solar light generation association, published at Ohm Corp on Feb. 10, 2000) pages 115 to 116, the higher the building height, the greater the wind pressure acting on the solar cell system. For example, the wind pressure is proportional to the square root of the part of the height of the building not more than 16 meters and proportional to the fourth root of the height for the part exceeding 16 meters. Therefore, one may surmise that the method of fixing a solar cell system to a high-rise building is a factor in high costs.

A solar cell module is formed in the shape of a flat plate with a large surface area in order to adequately receive solar light. The solar cell module normally has a transparent glass plate on the surface thereof so that solar light adequately reaches an internal photoelectric conversion element and so as to be durable enough for outdoor installation. Therefore the large-area plate-like glass plate occupies much of the weight of the solar cell module and is fairly heavy. When the glass plate is damaged, a state arises where a multiplicity of sharp-edged pieces exists and care must be taken in handling same.

Methods that fix this kind of solar cell module to the surface of a roof have been developed conventionally. For example, Japanese Patent Application Laid Open No. H8-288532 discloses a method that installs a mount to the surface of a roof by driving an anchor into the surface of the roof and fixing the mount to the anchor, and then installs a solar cell module on the mount. However, in this method, the roof surface sustains damage as a result of driving the anchor into the roof surface and there is therefore the risk of a drop in long-term waterproofing properties. An object of the roof surface where the mount is installed is to prevent the invasion of rain water into the building. For example, the whole of the roof surface of a building has a structure with a waterproof layer consisting of waterproof asphalt and a waterproof sheet and so forth. In order to resolve this problem, Japanese Patent Application Laid Open No. 2000-017802 discloses a method for waterproofing the part in which the anchor is driven. However, there is then the problem of the costs and labor involved in the waterproofing. Hence, Japanese Patent Application Laid Open No. H9-070188 discloses a method that, instead of using this method of fixing by means of an anchor, performs fixing by fastening a concrete foundation to the roof surface via an adhesive and fixing a solar cell module to the concrete foundation. However, maintenance mainly for the purposes of waterproofing such as re-covering the waterproof sheet must be performed at regular intervals on the roof comprising the roof surface and there has been the problem that it is not possible to temporarily remove the solar cell system in the bonding that involves such bonding of the concrete foundation to the roof surface via the adhesive.

Further, because the solar cell module naturally exists at a high point around and below which people pass, for example, it is essential to prevent the solar cell module dropping to the area around the roof in the event of a typhoon or earthquake or the like. A method of fixing the mount to the roof surface by means of wires has been considered conventionally. In the case of this method, when it is assumed that a wind will blow up above the solar cell module and mount, because the mount is fixed to a flat roof, the direction in which the pull force on the wire acts must be more in the vertical direction than in the horizontal direction of the roof surface. In order to secure a vertical direction component for the wire pull force, the angle of attachment of the wire, taking the roof surface, that is, the installation surface, as the reference, must be an angle that is to a certain extent close to the perpendicular. On the other hand, with this method, it is possible to prevent the solar cell module dropping to the area around the roof surface. However, when the mount is fixed to the roof surface by means of wire, in order to render the attachment angle an angle that is close to the perpendicular, the position in which the wire is fixed cannot be spaced far from the mount and, therefore, ultimately, there is a need to erect an anchor bolt in the roof installation surface and the waterproof surface must be damaged. In addition, another problem with this method that has been cited is that, when the surface area of the mount is large, blow-up close to the center of the mount cannot be prevented by fixing only the periphery of the solar cell module by means of wire. Further, Japanese Examined utility model application publication No. S62-70454 discloses a method involving a structure in which a solar cell module is attached to a wire that is extended in the direction of the installation angle of the fixed mount. In this structure, the two ends of the wire are reliably tied to the main body of the mount and the solar cell module is attached in a state in which same can be locked to the extended wire. In this case, because the load of the wind pressure on the solar cell module is supported by the wire, a wire draw strength that is regularly high is required and slight fluctuations caused by the wind pressure load are unavoidable and there is a problem with long-term durability resulting from metal fatigue of the wire main body and attachment portion. Further, when the surface area of the mount increases, the above problems are exacerbated. Meanwhile, as disclosed in Japanese Patent (Kokai) Application No. H8-284351, in a structure installed on roof tiles, there is a structure in which a wire is reliably tied to an anchor bolt penetrating the installation surface and the mount is attached to the wire. In this case, there is a method that involves fixing leg portions attached to the mount to the roof surface by means of adhesive in order to prevent a rubbing movement by the mount caused by the wind and so forth. With this method, there is sometimes a problem with the waterproof structure of the penetration part due to the act of securing the mount attachment load by means of the anchor bolt that penetrates the roof surface via wire. Further, when the solar cell module is bonded after being fixed with wire, it is difficult to firmly and uniformly bond at all points and, when an excessive load is applied, there is the possibility of damage to weak points.

SUMMARY OF THE INVENTION

In view of the current situation, the present invention proposes an installation method that makes it possible to install plants and solar cells together on substantially the same plane by providing a mount installation structure that resolves problems related to maintenance and the effect of the shadows of both plants and solar cells, obviates the need for such localized waterproofing of the roof surface, which is costly and labor-intensive, and makes it possible to prevent a reduction in the long-term durability of measures to prevent the solar cell module dropping as a result of a regular load and slight fluctuations and so forth as well as blow-up close to the center of the mount.

As a result of intensive research, the present inventors found the following means. That is, a vegetation and solar cell complex system of a first aspect of the present invention involves a vegetation and solar cell complex system that installs a solar cell system and plant group together on the same roof surface, wherein the average height, from the roof surface, of the light-receiving surface of a solar cell module is greater than the average height of the plant group and is therefore able to resolve obstructions to the light received by the solar cell that arise from plant shadows.

A second aspect of the present invention involves a vegetation and solar cell complex system, wherein, when the average height from the roof surface of the planting group is a, the average height from the roof surface of the solar cell module is b, and the projection distance between the nearest plant group and the solar cell module is c, Equation 1 below is satisfied.

$$c \geq b-a \quad \text{(Equation 1)},$$

whereby obstruction of the light received by the solar cells caused by plant shadows and obstruction of the light received by plants caused by solar cell shadows are resolved.

A third aspect of the present invention involves a vegetation and solar cell complex system, wherein a heat-insulating material and/or moisture-rich material is laid between the nearest plant group and the solar cell module and/or between solar cell modules and/or between plant groups, whereby the heat island suppression effect can also be supplied to parts without plants or solar cells and so forth.

A fourth aspect of the present invention involves a vegetation and solar cell complex system, wherein the heat-insulating material is a cementitious molding with a gap between the roof surface and the surface of the heat-insulating material, and a fifth aspect of the present invention involves a vegetation and solar cell complex system, wherein the moisture-rich material is earth, sand, and a mixture thereof, whereby the third aspect of the present invention can be implemented at low cost.

A sixth aspect of the present invention is a vegetation and solar cell complex system, wherein the plant group is a shrub and/or grass, which makes it possible to resolve the obstruction of light received by the solar cells that is caused by plant shadows.

A seventh aspect of the present invention involves a vegetation and solar cell complex system that installs a solar cell system and plant group together on the same roof surface, wherein the plant group and the solar cell system comprises a region where people can walk between at least one opposing pair of plant group and solar cell system, which simplifies maintenance.

An eighth aspect of the present invention involves a vegetation and solar cell complex system, wherein a heat-insulating material is laid in the region where people can walk. A ninth aspect of the present invention involves a vegetation and solar cell complex system, wherein the heat-insulating material is a cementitious molding having earth, sand, and a mixture thereof and a gap between the roof surface and the surface of the heat-insulating material. A tenth aspect of the present invention involves a vegetation and solar cell complex system, wherein the height, from the roof surface, of the heat-insulating material is less than that of the solar cell module, which makes it possible to also supply the heat island suppression effect to areas that can be walked on for the sake of maintenance.

An eleventh aspect of the present invention involves a vegetation and solar cell complex system that installs a solar cell system produced by installing a mount and fixing a solar cell module onto the mount, and a plant group together on the same roof surface, wherein at least the plant group and the side of the mount are substantially adjacent to one another, which makes it possible to prevent shadows caused by the solar cell module from becoming an obstacle to the cultivation of plant groups and to reduce the wind pressure acting on the solar cell system by means of a plant anti-wind pressure.

A twelfth aspect of the present invention involves a vegetation and solar cell complex system, wherein the average height of the plant group is less than the average height of the light-receiving surface of the solar cell and the plant group covers half or more of the area permitting ventilation of the mount side, which reliably reduces the wind pressure acting on the solar cell system by means of a plant anti-wind pressure.

A thirteenth aspect of the present invention involves a vegetation and solar cell complex system, wherein a heat-insulating material is laid between a nearby plant group and solar cell module and/or between solar cell modules and/or between plant groups, the height from the roof surface of the heat-insulating material is less than that of the solar cell module and the heat-insulating material covers half or more of the area permitting ventilation of the solar cell system, which reduces the wind pressure acting on the solar cell system by means of a heat insulating material anti-wind pressure.

A fourteenth aspect of the present invention involves a vegetation and solar cell complex system, wherein moisture-rich material is laid between a nearby plant group and solar cell module and/or between solar cell modules and/or between plant groups, the height from the roof surface of the moisture-rich material is less than that of the solar cell module, and the moisture-rich material covers half or more of the area permitting ventilation of the solar cell system, which makes it possible to reduce the wind pressure acting on the solar cell system by means of a moisture-rich material anti-wind pressure.

A fifteenth aspect of the present invention, wherein the solar cell system provides a frame for holding the solar cell on at least two sides of the plate-like solar cell and the roof surface and the frame are bonded via pressure-sensitive adhesive material.

A sixteenth aspect of the present invention, wherein the solar cell system provides a frame for holding the solar cell and a mount to which the frame is fixed on at least two sides of the plate-like solar cell, and the roof surface and mount are bonded via pressure-sensitive adhesive material.

A seventeenth aspect of the present invention, wherein the pressure-sensitive adhesive material is provided on both sides of the base material.

An eighteenth aspect of the present invention, wherein the principal component of the pressure-sensitive adhesive material is a butyl resin or acrylic resin.

A nineteenth aspect of the present invention, wherein a mount for fixing the solar cell module to the roof surface is provided in the solar cell system, the mount is fixed to the roof surface by means of pressure-sensitive adhesive tape and is prevented from dropping by means of wire, and the wire is disposed via a gap that exists in parallel to the roof surface in the mount. Hence, the waterproofing of the roof surface is not reduced and the solar cell module can be prevented from dropping to the area around the roof even in the event of a typhoon or earthquake and so forth. Further, because localized waterproofing of the roof surface is not required and there is no need for the wire to be usually stretched at high strength, it is possible to prevent a drop in the long-term durability of the measures to prevent the solar cell module from dropping as a result of the regular load and slight fluctuations. In addition, blow-up close to the center of the mount can be prevented.

A twentieth aspect of the present invention, wherein both ends of the wire are fixed to a heavy load on the roof surface. Hence, there is no need to provide a fixing tool such as a wire fixing anchor bolt that penetrates the waterproof layer and the waterproofing can be maintained.

A twenty-first aspect of the present invention, wherein the heavy load is a planting unit that constitutes the plant group. Hence, a mount that is esthetically preferential and kind on the environment can be implemented.

A twenty-second aspect of the present invention, wherein, after the mount is fixed to the roof surface by means of pressure-sensitive adhesive tape, the wire is led into the gap in the mount and both ends of the wire are fixed to the heavy load, whereby reliable and straight forward execution is possible.

A twenty-third aspect of the present invention, wherein a mount for fixing the solar cell module to the roof surface is provided in the solar cell system, the mount is fixed to the roof surface by means of pressure-sensitive adhesive tape and is prevented from dropping by means of adhesive tape, and the adhesive tape is led into the gap that exists in the mount. Hence, the waterproofing of the roof surface is not reduced and the solar cell panel can be prevented from dropping to the area around the roof even in the event of a typhoon or earthquake and so forth. Further, because localized waterproofing of the roof surface is not required and there is no need to usually stretch adhesive tape at high strength, it is possible to prevent a drop in the long-term durability of the measures to prevent the solar cell module from dropping as a result of the regular load and slight fluctuations.

A twenty-fourth aspect of the present invention, wherein both ends of the adhesive tape are fixed to the roof surface through adhesion. Therefore, a fixing tool such as an anchor bolt that penetrates the waterproof layer is unnecessary, whereby a more economic solar cell installation structure with a superior waterproof characteristic can be implemented.

A twenty-fifth aspect of the present invention, wherein, after the mount is fixed to the roof surface by means of pressure-sensitive adhesive tape, the adhesive tape is led into the gap in the mount, and both ends of the adhesive tape are fixed to the roof surface through adhesion, whereby reliable and straightforward execution is possible.

A twenty-sixth aspect of the present invention combines the drop prevention using wires and the drop prevention using adhesive tape to constitute amount installation structure that stabilizes the fixing of the pressure-sensitive adhesive tape to the installation surface of the mount and so forth and which excels in terms of economy and reliability.

A twenty-seventh aspect of the present invention, wherein, after the mount has been fixed to the roof surface by means of pressure-sensitive adhesive tape, the adhesive tape is led into the gap in the mount, both ends of the adhesive tape are fixed to the roof surface through adhesion, the wire is led into the gap in the mount, and both ends of the wire are fixed to the heavy load, whereby reliable and straightforward execution is possible.

DESCRIPTION OF THE PREFERRED EMBODIMENTS

Embodiments of the present invention will be described in detail hereinbelow with reference to the attached drawings. First, the first embodiment of the present invention will be described based on FIGS. 1 to 6.

Figure 1:
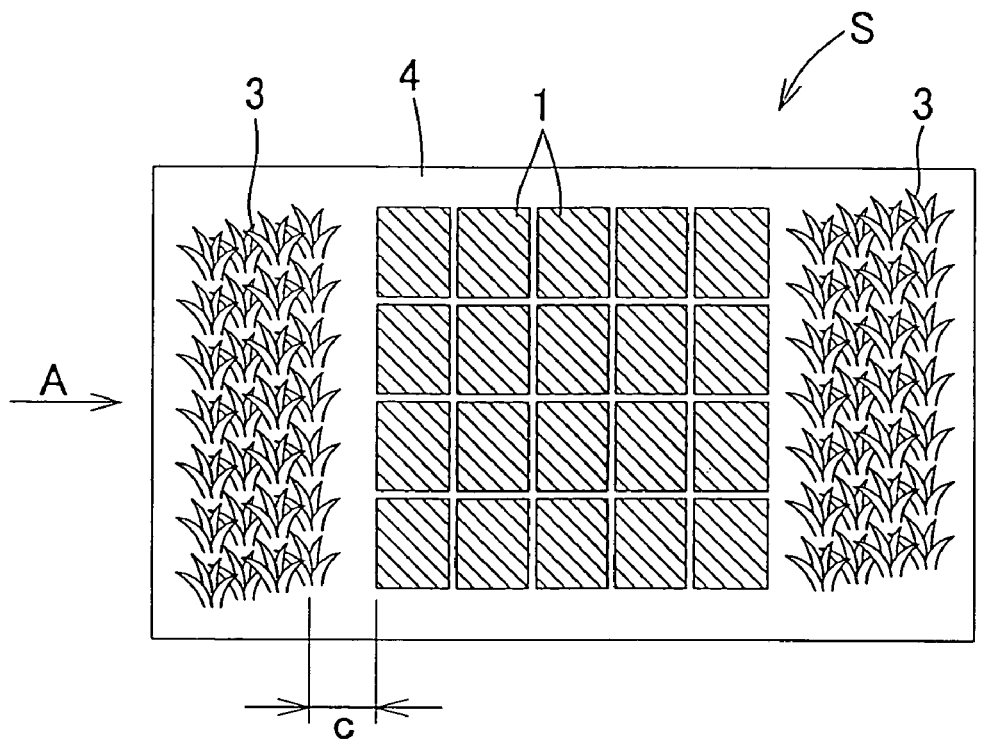
FIG. 1 is a planar view of the arrangement of a solar cell system and plant group.
Figure 2:
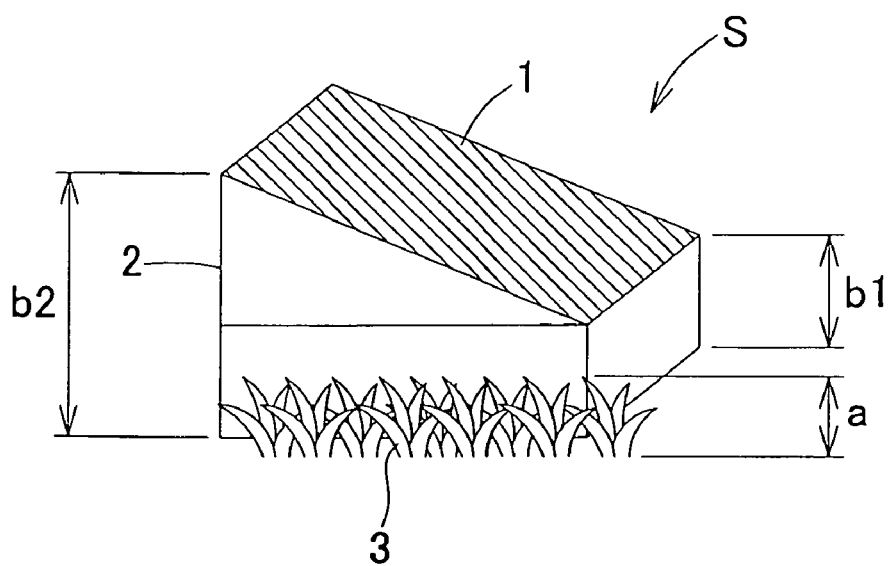
FIG. 2 is a perspective view of the height of a solar cell module 1 and the height of a plant group 3 from the roof surface.

As shown in FIGS. 1 and 2, a vegetation and solar cell complex system S of this embodiment is a system that installs a solar cell system 10 and a plant group 3 together on the same roof surface 4 and the average height b from the roof surface 4 of the light-receiving surface of a solar cell module 1 is greater than the average height a of the plant group 3.

Here, 'roof' indicates a roof of an architectural structure including that of a building or house or the like. However, in order to maximize the effects of the present invention, a roof, that is, a roof surface with a small gradient is preferable.

'Plant group 3' denotes one or more types of plant or two or more types of plant. Example of plants include trees such as broadleaf trees, evergreen trees, deciduous trees, conifers, bamboo and plants such as schizopetalous flower, sympetalae, monocotyledons, gymnospermous, cedar, moss. In the case of the present invention, an easily cared plant with a relatively low growth height is preferable, succulent plants (cacti) in particular being one preferred form, such as *Haworthia* (Liliaceae), *Gasteria* (Liliaceae), *Agave Americana*, and *Mesembiiant*. Litops, for example. The most preferable plants are evergreen herbaceous perennials, in particular *Crassulaceae Sedum* (technical name '*Sedum*'), for example, and, more precisely, Little Gem, *Sedum lineare f. variegatum, Echinacea purpurea, Sedum stahlii, Sedum dendroideum, Sedum Oryzifolium, Sedum hintonii, Sedum porifera, Sedum adolphii, Sedum brevifolium, Sedum aurora, Sedum Corynephyllum, Sedum chameleon*, and so forth. Further, when plant disease and color tone and so forth are considered, the installation of plants of a plurality of types is preferable.

A solar cell can be organic, or based on a compound semiconductor or silicon, or the like, for example, and can be classified as being of the monocrystalline type, polycrystalline type, or thin-film type, or can be a complex system, such as a combination of the monocrystalline and thin-film types or the polycrystalline and thin-film types, for example. As described subsequently, when it is a requirement that the average height b from the roof surface of the light-receiving surface of the solar cell module should be greater than the average height a of the plant group, because the lower the installation tilt angle of the solar cell, the greater the freedom to select the height of the plant group, a solar cell that exhibits no considerable drop in power generation efficiency when sunlight enters at a low angle is preferably selected. Preferable formats include a thin-film silicon type and a complex system of a thin-film silicon type and a polycrystalline silicon.

The solar cell system 10 comprises at least a solar cell module and is constituted by all or part of wiring, a solar cell fixing tool or fixing mount and wiring connection material, an inverter, and a converter, and a format that permits long-term effective usage of power that is generated with the solar light as the energy source.

Figure 4:
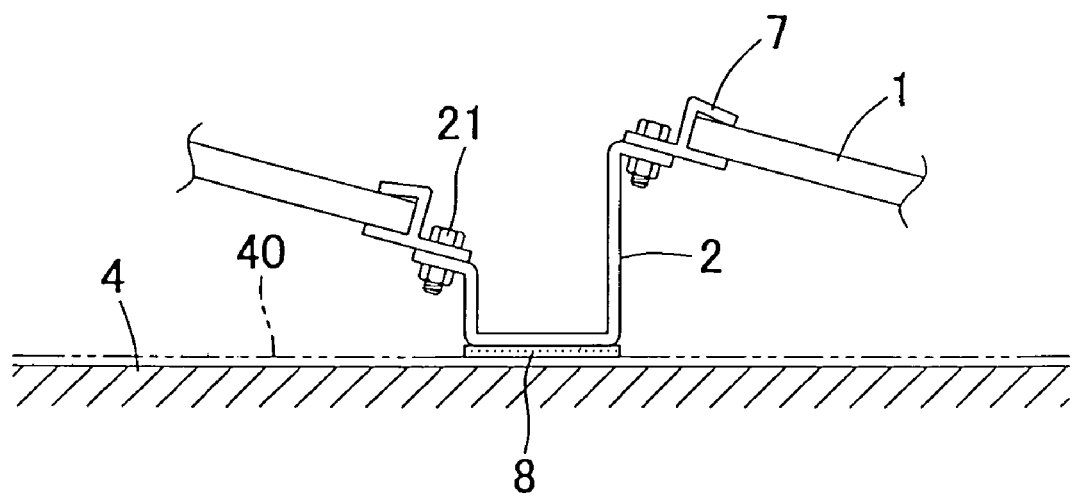
FIG. 4 is similarly a cross-sectional view of another attachment structure of the solar cell module.
Figure 6:
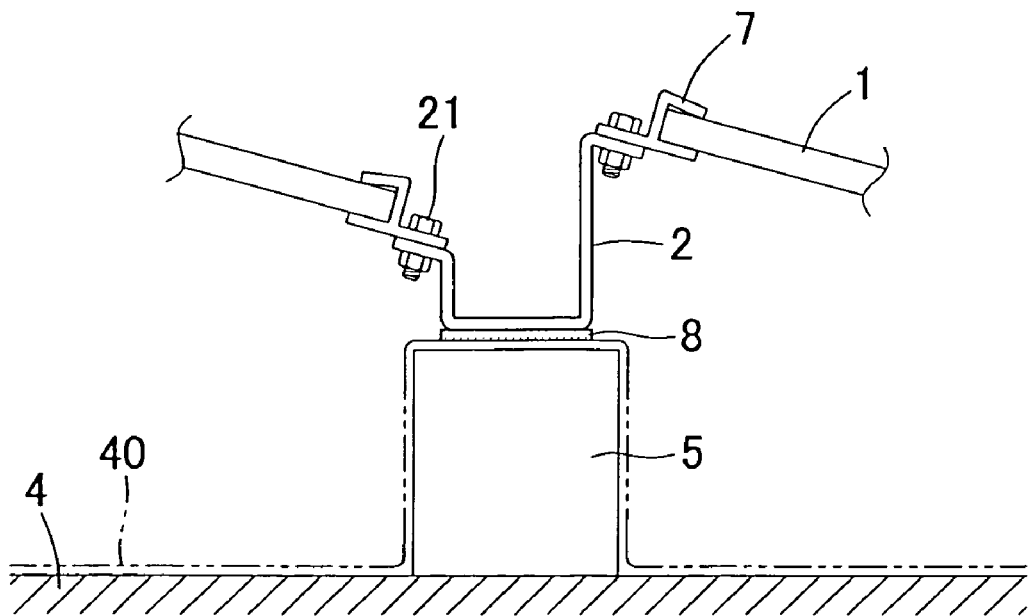
FIG. 6 is similarly a cross-sectional view of another attachment structure of the solar cell module.

More precisely, as shown in FIGS. 4 and 6, and so forth, a frame 7 that holds the solar cell and a mount 2 that supports the frame are provided on at least two sides of a plate-like solar cell and the roof surface 4 and the mount 2 are bonded via a pressure-sensitive adhesive material.

In FIG. 4, the mount 2 is fixed onto a waterproof sheet 40 by using double-side tape 8 and the solar cell module can be fixed without making any holes in the waterproof sheet 40. Further, FIG. 6 illustrates a method of fixing the mount 2 to the waterproof sheet 40 on a concrete block 5 by means of double-sided tape. Such a solar cell system does not lower the waterproof characteristics of the roof surface or the reliability thereof with respect to watertightness and possesses the characteristic of being easily removed when roof maintenance is carried out.

The mount 2 is an integral body of a metal material or cement molding or the like having a stepchild portion and bolt holes and so forth for fixing the solar cell module and usage of plural materials or materials of a plurality of types in order to fix the solar cell module is also included. Generally, although a plurality of solar cell modules are used fixed to one mount by fixing a plurality of solar cell modules in the longitudinal direction of rod-shaped material, a system of attaching one module to one mount is also preferable.

'The pressure-sensitive adhesive material' above is a general term for organic or inorganic matter with adhesive properties. However, more specifically, possible examples of adhesive material include acrylic, butyl, silicon, urethane, natural rubber, synthetic rubber, and so forth, and, in this example, acrylic or butyl are most preferable from the perspective of long-term durability, such as water resistance and high temperature stability, and cost.

The double-sided tape 8 is produced by providing pressure-sensitive adhesive material on both sides of a base material, and possible base materials include a resin film, metallic tape, foaming resin, nonfoaming resin, nonwoven fabric, paper, and so forth. The base material is suitably selected from the perspective of ease of use, the elasticity of the base material, the strength of the base material, and the compatibility thereof with the pressure-sensitive adhesive material and, in this example, the foaming resin or nonwoven fabric are the most preferable. Further, because there is a risk of detachment at the interface between the base material and pressure-sensitive adhesive material when an external force acts on the double-sided tape 8, a base material that provides intimate contact between the base material and pressure-sensitive adhesive material should be selected. From that standpoint, the base material and pressure-sensitive adhesive material are preferably constituted by material of the same type. For example, an acrylic foaming base material and an acrylic pressure-sensitive adhesive material are a preferable combination. Further, the double-sided tape 8 is created by coating, crimping, or thermal-bonding pressure-sensitive adhesive material on/to the base material or impregnating the base material with adhesive, and the interface between the base material and pressure-sensitive adhesive material can also be substantially eradicated through common extrusion or the like of the base material and pressure-sensitive adhesive material. The solar cell system must calculate, assume and suitably determine the wind load on the solar cell system, fluctuating loads caused by earthquakes with respect to the usage amount of pressure-sensitive adhesive material, application area or usage amount of double-sided tape, and the area of attachment. As a result, the area of the mount bottom in contact with the pressure-sensitive adhesive material and the double-sided tape 8 and the area of the frame bottom must be designed to adequately stick the pressure-sensitive adhesive material and the double-side tape 8.

In this example, the temporarily fixed mount 2 and the frame 7 can be removed for the sake of maintenance and so forth of the waterproof sheet 40. Here, this involves relatively straightforward work by placing electrically heated wire that has been heated on the pressure-sensitive adhesive material and partially removing the electrically heated wire as softening occurs, for example. On the other hand, when fixing is with an adhesive, it should be noted that the removal work is extremely difficult because the adhesive will have hardened.

Figure 5:
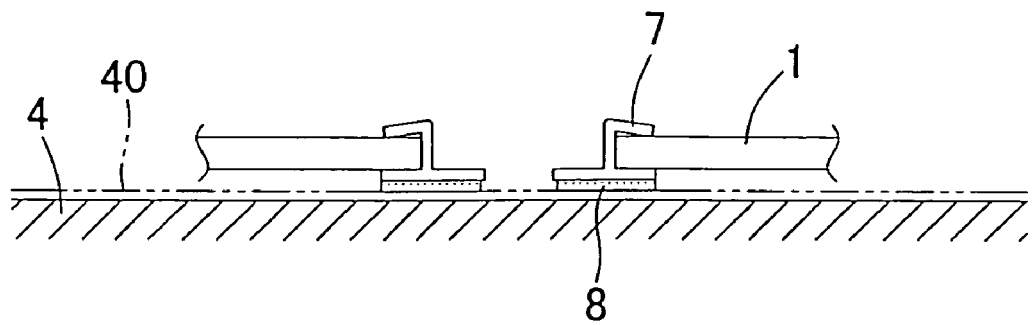
FIG. 5 is similarly a cross-sectional view of another attachment structure of the solar cell module.

Further, as a modified example, a method of fixing the frame 7 by means of the double-sided tape 8 that does not employ a mount as shown in FIG. 5, that is, according to which the frame 7 holding the solar cell is provided on at least two sides of the plate-like solar cell and the roof surface 4 and the frame 7 are bonded via pressure-sensitive adhesive material is preferable.

Figure 3:
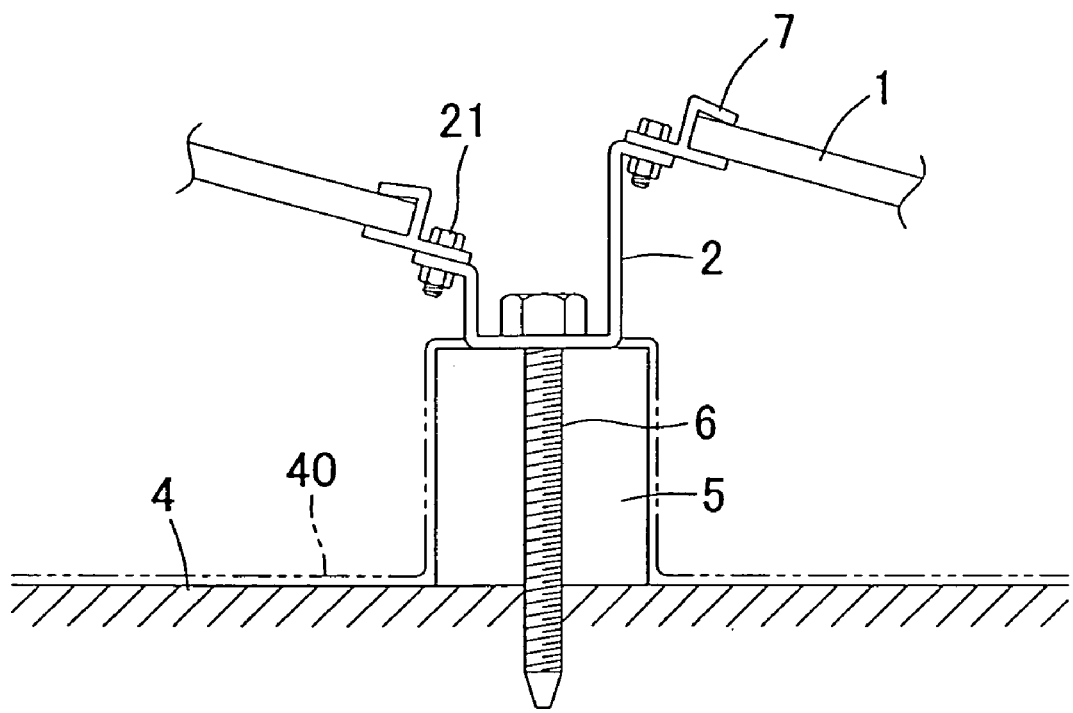
FIG. 3 is a cross-sectional view of an attachment structure of the solar cell module.

Further, as shown in FIG. 3, the mount 2 is fixed to the roof surface 4 by using an anchor bolt 6 and a solar cell module made by combining the frame 7 with the solar cell module 1 may be fixed to the mount 2 by means of a bolt 21.

FIG. 2 shows the height from the roof surface 4 of the solar cell module 1 and the height of the plant group 3. The average height b from the roof surface of the light-receiving surface of the solar cell module is given by Equation 2 below when the lowest height of the solar cell module is b1 and the maximum height is b2.

$$b=(b1+b2)/2 \quad \text{(Equation 2)}$$

Further, the average height a from the roof surface 4 of the plant group 3 is the height that is assumed by means of individual weighted average for the height of each individual plant. The average height b from the roof surface of the light-receiving surface of the solar cell module is preferably greater than the average height a from the roof surface e of the plant group. This is in order to prevent the occurrence of shadows caused by the plant group on the light-receiving surface of the solar cell module and to prevent the solar cell module from obstructing light reception. Further, the projection distance between the nearest plant group and the solar cell module as shown in FIG. 1 preferable satisfies Equation 1 below.

$$c \geq b - a \quad \text{(Equation 1)}$$

This is because, when Equation 1 above is not satisfied and Equation 3 below is satisfied, a shadow caused by the solar cell module is cast on the plant group and obstructs cultivation of the plant group.

$$c < b - a \quad \text{(Equation 3)}$$

Although not shown, regions where people can walk are maintained as paths during maintenance between the plant group 3 and the solar cell system 10, mutually between the plant groups 3 and mutually between the solar cell systems 10, and heat-insulating material and moisture-rich material and so forth are laid in the regions, whereby a heat island suppression effect is afforded. The heat-insulating material is exemplified by a foam body, i.e. an organic foam body such as styrene foam, ethylene-propylene copolymer foam, or urethane foam, for example, provided with a metal plate, a coating to cut out ultraviolet light, or a light-resistant material or the like, or an inorganic foam body such as a cement foam or pumice stone, and further exemplified by a hollow cement molding, hollow resin molding, heat-insulating block, and a pebble layer built up to contain air. Further, the moisture-rich material is exemplified by a water-absorbent polymer, a continuous bubble foam, or a fine powder that is stacked to contain gaps, which constitute materials that hold rainwater and allow the periphery to be substantially cooled by means of the vaporization heat of the rainwater during high temperatures. However, earth and sand or the like are preferable from the standpoint of cost and durability.

Figure 7:
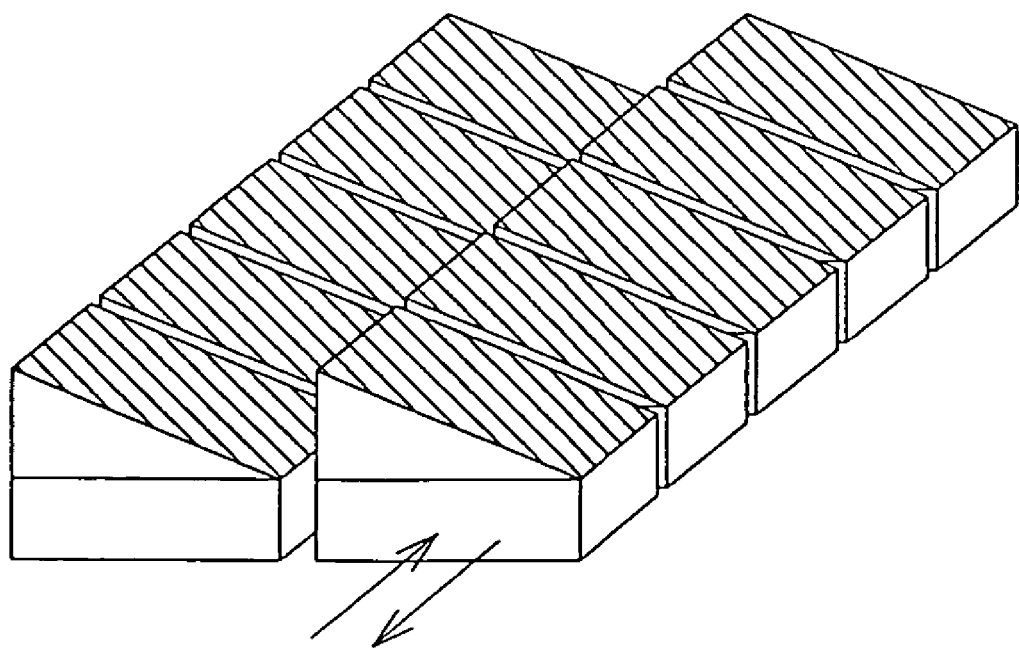
FIG. 7 is a view on arrow of the solar cell system.

The second embodiment of the present invention will be described next with reference to FIG. 7.

The vegetation and solar cell complex system S of this embodiment is one in which the mount 2 is installed on the same roof surface 4 and a solar cell system rendered by fixing the solar cell module 1 to the mount and a plant group are installed together such that at least the side of the mount 2 and the plant group 3 substantially adjoin one another. Further, the plant group 3 is established to cover half or more of the area that can be ventilated of a mount side 20 and the wind pressure acting on the solar cell system is reduced by the plant anti-wind pressure.

The arrangement of the solar cell system 10 and the plant group 3 of this embodiment is the same as that in FIG. 1 of the first embodiment. FIG. 7 is a partial view on arrow in the direction of arrow A that serves to illustrate the side of the frame and the area that can be ventilated of the side of the frame, and the frame side 20 shows the side of a row of solar cells.

The mount 2 is an integral body of a metal material or cement molding or the like having a stepchild portion and bolt holes and so forth for fixing the solar cell module as well as an integral body of a metal material or cement molding or the like having a stepchild portion and bolt holes and so forth for fixing the mount to the roof surface, and usage of plural materials or materials of a plurality of types in order to fix the solar cell module is also included. Generally, although a plurality of solar cell modules are used fixed to one mount by fixing a plurality of solar cell modules in the longitudinal direction of rod-shaped material, the present invention also includes a system of attaching one module to one mount.

The average height b from the roof surface of the light-receiving surface of the solar cell module is preferably greater than the average height a from the roof surface of the plant group 3 similarly to the first embodiment above. This is to prevent the occurrence of shadows caused by the plant group on the light-receiving surface of the solar cell module and to prevent the solar cell module from obstructing light reception.

As detailed above, generally, the mount is constituted using a rod-shaped material and the mount side 20 is in a state that permits ventilation. In this embodiment, this area is called the area permitting ventilation. On the other hand, when part or all of the mount side is constituted by a plate material or the like and does not permit ventilation, part of the mount side area is the area permitting ventilation. Although ventilation is also possible in a direction perpendicular to the ventilation direction shown in FIG. 8, when the mount is a rod-shaped material, the area permitting ventilation of the mount side is larger, which is an aspect that the present invention aims at. The solar cell system is designed and executed to regularly assume the negative pressure generated by the wind passing through the top of the solar cell module to be fixed to the roof surface at a strength that makes it possible to prevent scattering. However, the wind pressure that occurs as a result of ventilation in the direction of the mount side is hard to assume regularly and the fixed design of a secure, that is, high-cost solar cell system, in which a higher margin of safety is considered, is economically problematic to execute. Methods for resolving this problem can be exemplified by the reduction of the area permitting ventilation by covering the mount side with a plate material but such a method has the following three problems. (1) The mount weight increases and there is the possibility of a problem arising with the roof's load tolerance. (2) The mount is costly. (3) The air between the solar cell module and roof reaches a high temperature and the indoor cooling load increases. According to this embodiment, by arranging plant groups, heat-insulating material, and moisture-rich material adjacent to the mount side or by arranging the plant groups, heat-insulating material, and moisture-rich material in a state covering half or more of the area permitting ventilation, the problem of the wind pressure that arises as a result of the ventilation in the direction of the mount side can be resolved.

Further, although not illustrated, heat-insulating material and moisture-rich material and so forth are laid similarly to the first embodiment above between the plant group 3 and the solar cell system 10, mutually between the plant groups 3, and mutually between the solar cell systems 10, whereby a heat island suppression effect is afforded. However, the constitution is such that the height from the roof surface of the heat-insulating material and moisture-rich material and so forth is less than that of the solar cell module, and the heat-insulating material and moisture-rich material and so forth are established to cover half or more of the area permitting ventilation of the solar cell system, whereby the wind pressure acting on the solar cell system can be reduced by means of the anti-wind pressure of the heat-insulating material and moisture-rich material and so forth.

A third embodiment of the present invention will be described next on the basis of FIGS. 8 to 10.

Figure 8:
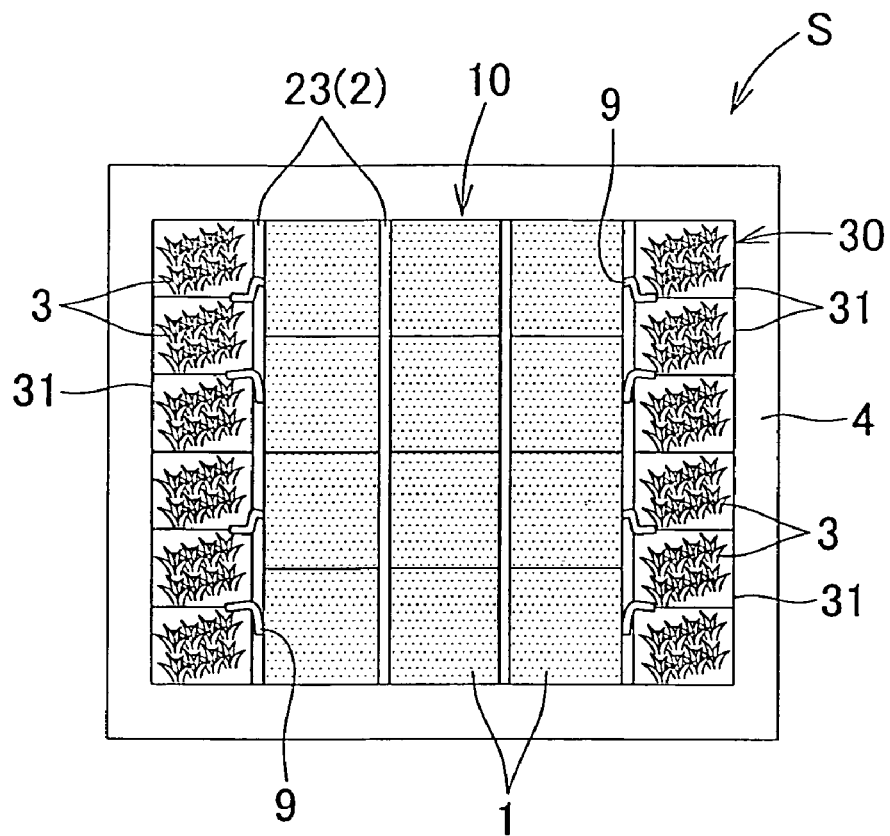
FIG. 8 is a planar view of the arrangement of the solar cell system and plant group of the third embodiment.
Figure 9:
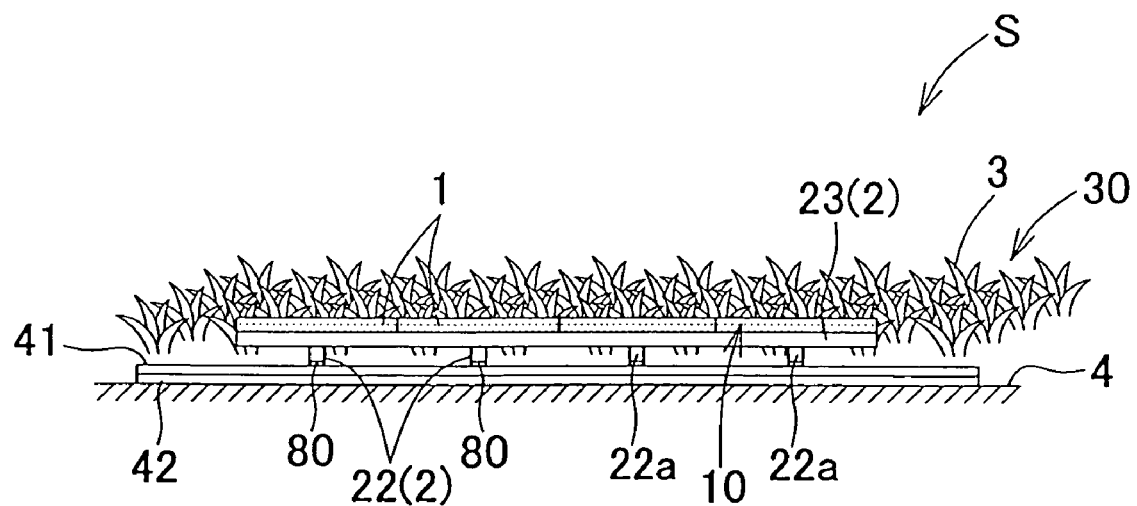
FIG. 9 is a cross-sectional view of the attachment structure of the solar cell module.
Figure 10:
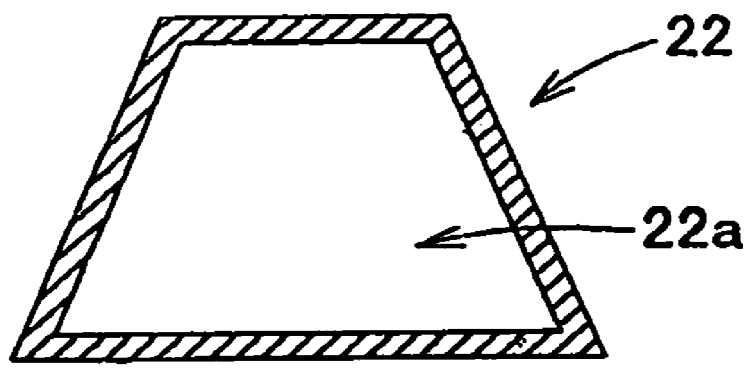
FIG. 10 is a cross-sectional view of a pedestal.

As shown in FIGS. 8 and 9, the vegetation and solar cell complex system S of this embodiment is constituted such that the mount 2 for fixing the solar cell module 1 is fixed to the roof surface 4 by means of pressure-sensitive adhesive tape 80 and is prevented from dropping by means of wires 9. More specifically, the wires 9 are arranged to pass through gaps 22a that exist in parallel to the roof surface 4 of the mount 2 and more reliably prevent the solar cell module 1 from dropping to the periphery of the roof even in the event of a typhoon or earthquake or the like.

The mount 2 comprises a mount rail 23 and a pedestal 22 and the solar cell module 1 is stacked on the mount 2. The mount rail 23 is fixed onto the pedestal 22 by means of bolts and the solar cell module 1 is stacked on the mount rail 23. Thereupon, the timely insertion of a sheet consisting of hard rubber as a spacer between the mount rail 23 and the pedestal 22 is preferable in order to avoid a situation where the parallelism of the mount rail 23 cannot be secured as a result of the influence of nonlanding, that is, a state where the roof surface 4 and the mount rail 23 located on the lowermost layer do not make adequate contact. As a result of this fact, the concentrated load on part of the pedestal 22 as a result of the non-uniform distribution of the load of the cell panel 5 and the mount rail 23 and so forth is reduced and a stable fixing of the mount 2 on the roof surface 4 is made possible.

The wire 9 is passed through the gap 22a provided in the pedestal 22 and the two ends of the wire 9 are fixed to suitable points of the heavy load on the roof surface 4 such as to the outer perimeter of a planting unit 31 that constitutes the plant group 3 of a rooftop vegetation system 30. A number of wires lie in the direction of the length of the mount rail 23, and a plurality of wires can be provided in a direction orthogonal to the lengthways direction of the mount rail 23. If strong wire is used, sufficient stability is achieved without a cantilever by means of two wires one each of which is provided in the gaps 22a in the pedestal 22 at the two ends of the rail 23. One wire may also be used if passed through the gap 22a in the pedestal 22 at the center of the rail 23.

Except for the planting unit 31, a heavy load may consist of concrete or a lump of metal or the like, and may be disposed at the two ends of the wire 9 to make it possible to prevent the solar cell module 1 from dropping as a result of the mount 2 moving and being damaged under its own weight in the event of a typhoon or earthquake or the like. Generally, the load tolerance of a building is 180 kg/m$^2$ or less and the total weight of the heavy load, the mount 2 and the solar cell module 1 must be set at or below a weight rendered by multiplying the total weight of the roof surface of the building by the weight tolerance. On the other hand, based on the objective of preventing the solar cell module 1 from dropping, a weight of at least 10% of the blow-up load on the total mount area must be secured as the total weight. There is no need to damage the waterproof layer of the roof surface 4 because the wire 9 is fixed to the heavy load installed on the roof surface 4, which is economical because construction work to repair the waterproof layer is not produced.

The rooftop vegetation system 30 is a system that covers one surface of the roof of a building with plants as a heat island countermeasure, and is a system affording superior esthetics and which makes it possible to prevent concrete heat accumulation on the roof of a building as a result of the effect of shielding the direct rays of the sun. Further, in a city with little greenery, the rooftop vegetation system provides spaces that are kind on the environment. The rooftop vegetation system 30 consists of the plant groups 3 and is more specifically constituted by lining up a plurality of the planting units 31 into which soil and plants have been inserted on a roof surface. The plants of the plant group 3 are the same as those used in the case of the first embodiment above.

The planting unit 31 is generally fixed onto the roof surface 4 by means of an attachment tool via the four corners to prevent the planting unit 31 from flying away during a typhoon and constitutes a structure in which a plurality of the planting units 7 are integrated. Therefore, when the integrated planting units 7 are used as the heavy load, a load of 30 kg/m$^2$ to 60 kg/m$^2$ can be secured. Further, usage of the rooftop vegetation system as the heavy load means that there is no need to newly prepare a heavy load, which is economical and can be linked to a reduction in construction materials.

The wire 9 is preferably the wire rope used for the structure mentioned in Japanese Industry Standard JIS G 3549 from the standpoint of strength and durability. Further, there is no need to extend the wire forcefully and the two ends may be fixed in a state without slack. The object of using the wire 9 is to prevent the mount from dropping in the event of a typhoon when the fixing strength of the pedestal that is fixed by means of pressure-sensitive adhesive tape drops slightly for unforeseen reasons.

The solar cell module 1 is fixed and attached by means of bolts on the mount rail 23. The installation angle of the solar cell module 1 is preferably a low angle of no more than ten degrees with respect to the horizontal surface in order to reduce the wind load. Further, the surface of the solar cell module 1 is constantly affected by a sediment such as dust and, therefore, an installation angle of at least one degree is preferred in order to render maintenance such as cleaning unnecessary by causing the dust to flow naturally as a result of rainwater. Therefore, an installation angle of two to eight degrees, which makes it possible to achieve a reduction in the wind load due to the low angle and the natural washing effect of rainwater is most preferable. The solar cell is the same as that in the first embodiment above.

The pedestal 22 is afforded a structure with the gap 22a. The gap 22a is fitted so as to open in the oblique direction of the solar cell module 1, which is preferable from the standpoint of securing the preliminary strength with respect to the wind load during a sudden gust for the wire 9. The lower side of the pedestal 22 is fixed to the roof surface 4 by means of the pressure-sensitive adhesive tape 80 and the mount rail 23 is fixed to the upper side of the pedestal 22 by means of a bolt. That is, the pedestal 22 has the function of fixing the mount rail 23 to the roof surface 4. Further, a coating film constitution conforming to Japanese Industry Standards (JIS) is preferable for the surface processing of the pedestal 22. The surface to which the pressure-sensitive adhesive tape 80 of the pedestal 22 is stuck greatly affects the adhesive strength and the long-term durability of the adhesive strength and, hence, clear-coat processing is preferable. The pedestal 22 must be secured over an area that is produced by multiplying the number of areas of adhesion with the roof surface 4 for securing the adhesive strength that secures the blow-up load of the whole of the solar cell system that comprises the solar cell module 1 and the mount 2 based on the Building Standards Act by the lower surface area of the pedestal 22. Further, materials for the pedestal 22 include aluminum, stainless steel, hot-dipped galvanized plated steel material, and high-strength plastic, which make it possible to secure structural strength and long-term weather resistance. However, aluminum is most preferable from the point of view of workability and economy. The pedestal 22 employed by the present invention constitutes a structure with the gap 22a in order to exhibit the above drop prevention function using the wire 9. However, the cross-section of the gap is preferably a trapezoidal shape with a long base and an area of 10 cm$^2$ or more from the perspective of ease of work, cost, and adhesive strength. However, the gap of the present invention is not limited to a gap with such a cross-section and may instead be a latch portion that is able to latch the wire and adhesive tape and so forth or an upwardly open concave groove or the like.

An asphalt waterproof layer 41 is provided as waterproofing on the roof surface 4. The waterproof layer 41 must be formed firmly on the surface of the roof surface. A sheet layer 42 consisting of PET is made to adhere firmly to the whole surface of the upper surface of the asphalt waterproof layer 41 by using a butyl adhesive and formation through plasma processing is preferable. The plasma processing is preferably executed in order to secure the strength of adhesion of the pressure-sensitive adhesive tape to the roof surface 4. Further, from the standpoint of securing adhesive strength, it does not matter whether further processing is performed or if a different or additional outermost layer is formed.

The pressure-sensitive adhesive tape 80 is made of at least one substance chosen from among acrylic, fire-resistant acrylic, and synthetic rubber and is preferably made of acrylic from the standpoint of adhesive strength and weather resistance. Further, the thickness of the pressure-sensitive adhesive tape can be selected according to the thickness of the base material and is 5 mm or less but is particularly preferably 0.8 to 2 mm from the standpoint of economy and of securing adhesive strength. As an ideal structure, the pedestal 22 made of aluminum that has been extrusion-molded is fixed firmly by means of the pressure-sensitive adhesive tape 80 to the sheet layer 42. A surface pressure must be applied to the pressure-sensitive adhesive tape 80 in timely fashion during adhesion.

A specific example of the vegetation and solar cell complex system S according to this embodiment will be detailed hereinbelow.

The asphalt waterproof layer 41 is formed firmly on the substantially horizontal roof surface 4 on the building roof, the sheet layer 42 consisting of PET is made to adhere firmly to the whole of the upper surface of the asphalt layer 1 by using a butyl adhesive, and the outermost layer is formed through plasma processing. This plasma processing serves to secure the adhesive strength of the pressure-sensitive adhesive tape 80.

First, the fire-resistant acrylic pressure-sensitive adhesive tape 80 with a thickness of 1 mm is used, and the aluminum-made pedestal 22, which is afforded a gap through which the wire 9 passes and has been extrusion-molded and subjected to clear-coat surface processing, is firmly fixed to the sheet layer 42 by means of the pressure-sensitive adhesive tape 80. The pressure-sensitive adhesive tape 80 is made to adhere by applying surface pressure from above the pedestal 22 in timely fashion when same is stuck on the roof surface 4. The pedestal 22 is fitted in a direction in which the opening is directed in the direction of the slanted face of the solar cell module 1. Further, the face in contact with the roof surface 4 of the pedestal 22 has an adhesion area, which serves to secure the strength that secures the blow-up load based on the Building Standards Act, of 200 cm² and 50% thereof is designed as the effective adhesion area in which the pressure-sensitive adhesive tape 80 effectively contributes to the adhesion.

Thereafter, the mount rail 23 is fixed to the upper surface of the pedestal 22 by means of bolts. Thereupon, a sheet consisting of hard rubber is inserted as a spacer between the mount rail 23 and the pedestal 22 if necessary in order to alleviate the influence of nonlanding and secure parallelism for the mount rail 23. Thereafter, the wire 9 is passed through the gap 22a in the mount 22, the two ends of which are fixed to suitable points of the external perimeter of the linked planting unit 31 constituting the plant group 3 of the rooftop vegetation system 30. Four wires are installed in the direction of the length of the mount rail 23. Thereafter, the solar cell module 1 is stacked on the mount rail 23. In this specific example, there is no effect on the waterproof layer and the drop prevention function of the mount is achieved economically.

As a further example, after fixing the mount rail to the pedestal 22 by means of bolts, before passing the wire 9 into the gap 22a, the two ends of a pressure-sensitive adhesive tape 81 which passes through the gap 22a of part of the pedestal 22 are preferably fixed through adhesion to the roof surface 4. As a result, the waterproof layer is not affected and the drop prevention function of the mount is achieved economically. The pressure-sensitive adhesive tape 81 is a tape that consists of at least one substance chosen from among acrylic, fire-resistant acrylic, and synthetic rubber, and has a butyl or epoxy-based adhesive material or the like coated on the one side thereof. Further, a material rendered by sticking the pressure-sensitive adhesive tape or the adhesive material onto the two ends of one side of a metal plate that has been galvanized with aluminum or hot-dip galvanized may be used. In addition, the usage of adhesive tape instead of wire is also a preferred example.

The present invention detailed above makes it possible to prevent the obstruction of power generation by a solar cell caused by the shadows of a plant group in a vegetation and solar cell complex system that installs a solar cell system and plant group together on the same roof surface.

The obstruction of the cultivation of plant groups caused by the shadow of the solar cell can be prevented.

Moreover, the present invention makes it possible to provide a low-cost mount that resolves the problem of wind pressure that is produced by ventilation in the direction of the mount side.

What is claimed is:

1. A complex system of vegetation and solar cell in which a solar cell system and a plant group are installed together on a roof surface of a same plane, wherein an average height of a light-receiving surface of a solar cell module from the roof surface is greater than an average height of the plant group from the roof surface, b is the average height of the surface of the solar cell module from the roof surface;

a is the average height of the plant group from the roof surface;

c is the distance from the plant group and the solar cell module that are adjacent; and a, b and c satisfy the equation:

$$c \geq b - a.$$

2. The complex system of vegetation and solar cell according to claim 1, wherein a heat-insulating material and a moisture-rich material is laid between the plant group and the solar cell module, and between solar cell modules, and between plant groups.

3. The complex system of vegetation and solar cell according to claim 2, wherein the heat-insulating material is a cementitious molding with a gap between the roof surface and the surface of the heat-insulating material.

4. The complex system of vegetation and solar cell according to claim 2, wherein the moisture-rich material is earth, sand, and a mixture thereof.

5. The complex system of vegetation and solar cell according to any of claims 1 or 2 to 4, wherein the plant group is a shrub or grass.

6. The complex system of vegetation and solar cell according to claim 1 in which a solar cell system and a plant group are installed together on a roof surface, wherein the system comprises a walking region between at least one opposing pair of the plant group and the solar cell system.

7. The complex system of vegetation and solar cell according to claim 6, wherein a heat-insulating material is laid in the walking region.

8. The complex system of vegetation and solar cell according to claim 7, wherein the heat-insulating material is a cementitious molding having earth, sand, and a mixture thereof and the heat-insulating material includes a gap between the roof surface and the surface of the heat-insulating material.

9. The complex system of vegetation and solar cell according to claim 8, wherein a distance between the roof surface and the heat-insulating material is less than a distance between the roof surface and the solar cell module.

10. The complex system of vegetation and solar cell according to claims 1, 2 or 9, wherein the solar cell system provides a frame for holding the solar cell on at least two sides of the plate-shaped solar cell, and the roof surface and the frame are bonded via pressure-sensitive adhesive material.

11. The complex system of vegetation and solar cell according to claim 10, wherein the solar cell system provides a mount to which the frame is fixed on at least two sides of the plate-shaped solar cell; and
the roof surface and the mount are bonded via pressure-sensitive adhesive material.

12. The complex system of vegetation and solar cell according to claim 11, wherein the pressure-sensitive adhesive material is provided on both sides of a base material.

13. The complex system of vegetation and solar cell according to claim 12, wherein a principal component of the pressure-sensitive adhesive material is a butyl resin or an acrylic resin.

14. The complex system of vegetation and solar cell according to claim 13, wherein a mount for fixing the solar cell module to the roof surface is provided in the solar cell system, the mount is fixed to the roof surface by the pressure-sensitive adhesive material and is prevented from dropping by the adhesive; and the adhesive material is provided in a gap in the mount.

15. The complex system of vegetation and solar cell according to claim 14, wherein ends of the adhesive material are fixed to the roof surface through adhesion.

16. The complex system of vegetation and solar cell according to claim 15, wherein, after the mount is fixed to the roof surface by the pressure-sensitive adhesive material, the adhesive material is provided into the gap in the mount, and both ends of the adhesive material are fixed to the roof surface through adhesion.

* * * * *